UNITED STATES PATENT OFFICE

THOMAS SHERLOCK WHEELER AND JOHN MASON, OF NORTHWICH, ENGLAND, ASSIGNORS TO IMPERIAL CHEMICAL INDUSTRIES LIMITED, A CORPORATION OF GREAT BRITAIN

PROCESS FOR THE PRODUCTION OF CHLORINATED HYDROCARBONS

No Drawing. Application filed September 29, 1930, Serial No. 485,296, and in Great Britain October 24, 1929.

The invention consists in treating hydrocarbons e. g. methane, or methane containing gases such as natural gases or other aliphatic hydrocarbons or aromatic hydrocarbons or partly chlorinated hydrocarbons with chlorine gas or chlorine compounds under certain conditions, in order to produce chlorinated products for example methyl chloride, methylene chloride etc.

It has previously been proposed to chlorinate methane or the like by exposing the gas mixture to the influence of actinic light. It is also known that chlorination may be brought about by the action of heat, e. g. by passing mixtures of chlorine and methane relatively slowly through tubes heated to moderately high temperatures, usually in the presence of catalysts. Various methods have been suggested to overcome the difficulties caused by the violence of the reaction, such as by using a very large excess of methane, or by greatly diluting the reactants with non-reacting gases.

According to the present invention we pass a reactive mixture of chlorine or chlorine compounds and hydrocarbon or chlorinated hydrocarbon through a reaction zone or tube at high temperatures and high space velocities. Catalysts may or may not be used but it is preferred to avoid their use by working at higher temperatures and correspondingly high space velocities.

It is necessary to correlate the temperature and space velocity. The latter must be high enough to prevent explosion. The former must be high enough to bring about the necessary reaction-velocity especially where the reagents do not react readily. It is however necessary to avoid high temperatures with space velocities low enough to pyrolyze the products to form, for instance, aromatic hydrocarbons.

At very high temperatures and space velocities, unsaturated hydrocarbons such as acetylene are also produced, as well as chlorinated hydrocarbons, when chlorine and a hydrocarbon (e. g. methane) are treated for example at temperatures over 1000° C. (preferably 1200° C. to 1400° C.) and space velocities over 1000 reciprocal minutes (preferably over 5000).

Example 1

The initial gas consists of 3 volumes of methane to 1 volume of chlorine. The gases are mixed just as they enter an externally heated porcelain tube, packed with porcelain or fireclay fragments. The diameter of tube is 1 cm, heated length 15 cms. The temperature is 800° C. Space velocity (calculated as if the tube were not packed) 5500 reciprocal minutes.

Of the chlorine put in 25% is converted to methyl chloride, 15% to methylene chloride, 1.5% to chloroform and 1.5% to carbon tetrachloride, the balance gives hydrogen chloride. No pyrolysis was observed.

Example 2

The same gas mixture was passed through the same tube but unpacked; temperature 850° C. and space velocity 2100 reciprocal minutes.

Of the chlorine put in, 20.25 per cent was in this case converted to methyl chloride and the higher chlorinated bodies were produced in rather greater quantity; also there were traces of pyrolysis. The poorer result was caused by passing the gas more slowly although the temperature was higher and by using unpacked tube.

Example 3

A mixture consisting initially of chlorine and methyl chloride in ratio 1 to 5.4 is passed at 600° and a space velocity of 1045 reciprocal minutes through a tube 30 cms. long and 1 cm. in diameter, packed with pieces of fireclay. Of the chlorine input 46.7% is converted to methylene chloride and a trace (0.2%) to chloroform, the remainder going to hydrogen chloride. There is obtained practically theoretical conversion of methyl chloride, (after allowing for excess employed) to methylene chloride.

As will be observed from these examples, in some cases packed tubes, in others unpacked tubes, have been used. Generally speaking, the use of packed tubes is advantageous both in connection with chlorination of hydrocarbons and of already partly chlorinated hydrocarbons, particularly in the latter case when using such packed tubes practically complete conversion is obtained at temperatures lower than are required with unpacked tubes.

We therefore, carry out the reaction in the case of methane for example at temperatures of at least 600° C. and space velocities of at least 100 and preferably higher than several hundred reciprocal minutes (defined as the number of volumes of hot gas passing through unit volume of the reaction space in unit time). Under such conditions the reaction proceeds quite smoothly to give chlorine containing derivatives. In the case of methyl chloride as the initial substance to be chlorinated, the reaction temperature need not be as high as 600° C.

The nature and yield of these derivatives depends on the working conditions of the process i. e. on the composition of the gas mixture employed in the reaction, the temperature and space velocity, the use of packed or unpacked reaction chambers, and so on. It is advantageous to use an excess, though not necessarily a preponderatingly large excess, of methane over chlorine. Inert diluents such as nitrogen, steam and the like may be present, although the reactions proceed quite smoothly without them.

We may mix together the chlorine and the methane before introducing them to the high temperature reaction zone, or a mixture of the desired composition may be obtained by passing them at different predetermined rates into the said reaction zone. In the latter case one or more of the reacting substances may be, if desired, preheated. The products are separated in any known or suitable manner, e. g. cooled, washed with water and caustic soda, dried and subjected to low temperature cooling, for example with a mixture of carbon dioxide and ether or with liquid air, after which the liquids so obtained are fractionated.

Chlorinated hydrocarbons themselves may be used as the source of chlorine. Thus we may treat a mixture of a hydrocarbon and a chlorinated hydrocarbon at high space velocity and high temperature to produce a partially chlorinated hydrocarbon.

Alternatively partly chlorinated hydrocarbons may be further chlorinated e. g. methyl chloride may be converted into methylene chloride by interaction with chlorine at high space velocity, and high temperatures.

As many apparent and widely different embodiments of this invention may be made without departing from the spirit thereof, it is to be understood that we do not limit ourselves to the foregoing examples or descriptions except as indicated in the following claims:

We claim:

1. The process of producing chlorinated derivatives of aliphatic hydrocarbons containing at least one methylene group which comprises passing through a reaction zone a reactive mixture comprising a chlorinating agent and a chlorinatible substance of the class consisting of aliphatic hydrocarbons and partially chlorinated hydrocarbons capable of producing said chlorinated derivatives, at a temperature of at least 600° C., and a space velocity of at least 100 reciprocal minutes.

2. The process according to claim 1, wherein the reactive mixture comprises chlorine and an aliphatic hydrocarbon containing at least one methylene group.

3. The process of producing chloro derivatives of methane which consists in passing chlorine with an excess of methane through a reaction zone at a temperature of at least 600° C. and a space velocity of at least 100 reciprocal minutes.

4. The process of producing methylene chloride which consists in passing chlorine and an excess of methyl chloride through a reaction zone at a temperature above about 600° C., and a space velocity of at least 100 reciprical minutes.

5. The process of producing chlorinated derivatives of methane which comprises passing three volumes of methane and one volume of chlorine through an externally heated reaction zone at a temperature of 800° C. and a space velocity of 2100 reciprocal minutes.

6. The process of producing chlorinated derivatives of methane which comprises passing three volumes of methane and one volume of chlorine through an externally heated reaction zone, packed with refractory material, at a temperature of 800° C. and a space velocity of 5500 reciprocal minutes.

THOMAS SHERLOCK WHEELER.
JOHN MASON.